US012338386B2

(12) United States Patent
Hernandez et al.

(10) Patent No.: US 12,338,386 B2
(45) Date of Patent: Jun. 24, 2025

(54) FOLDABLE PARTICLES FOR LOST CIRCULATION MATERIALS AND RELATED METHOD

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Carlos Daniel Rodriguez Hernandez, Thuwal (SA); Ahmed Amr Mohamed Hafez Abdelaziz, Thuwal (SA); Thomas Finkbeiner, Thuwal (SA); Juan Carlos Santamarina, Thuwal (SA); Mohammad Arfaj, Dhahran (SA); Raed A. Alouhali, Dhahran (SA); Timothy Eric Moellendick, Dhahran (SA)

(73) Assignees: SAUDI ARABIAN OIL COMPANY, Dhahran (SA); KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/168,254

(22) Filed: Feb. 13, 2023

(65) Prior Publication Data
US 2024/0271027 A1   Aug. 15, 2024

(51) Int. Cl.
*E21B 33/138*   (2006.01)
*C09K 8/467*   (2006.01)
*E21B 43/34*   (2006.01)

(52) U.S. Cl.
CPC ............ *C09K 8/467* (2013.01); *E21B 33/138* (2013.01)

(58) Field of Classification Search
CPC ........ C09K 8/467; E21B 33/138; E21B 43/34
USPC .......................................... 166/293
See application file for complete search history.

(56) References Cited

U.S. PATENT DOCUMENTS

| 5,476,543 | A | 12/1995 | Ryan |
| 6,169,058 | B1 | 1/2001 | Le et al. |
| 7,799,744 | B2 * | 9/2010 | Welton ............ B01J 13/22 |
| | | | 507/221 |

(Continued)

FOREIGN PATENT DOCUMENTS

| CA | 2896355 A1 | 6/2014 |
| WO | 2015034479 A1 | 3/2015 |

OTHER PUBLICATIONS

Mrinmoy Roy et al (2021); "Photoinduced quasi-2D to 3D phase transformation in hybrid halide perovskite nanoplatelets." DOI https://doi.org/10.1039/D1CP03529K.

*Primary Examiner* — Zakiya W Bates
*Assistant Examiner* — Ashish K Varma
(74) *Attorney, Agent, or Firm* — Vorys, Sater, Seymour and Pease LLP

(57) ABSTRACT

Lost circulation materials may be particles having a core-shell structure. Said particles may include: a core comprising an expandable material; and a shell around the core, the shell comprising an outer permeable membrane, an inner permeable membrane, and a hardenable material between the outer and inner permeable membranes; and wherein the core-shell structure is folded. The particles may be initially folded where, upon exposure to a stimulus, the core expands in volume (which unfolds the particles) and the shell increases in strength. The expanded particles can then clog large openings/apertures in the formation.

16 Claims, 5 Drawing Sheets

(56) References Cited

U.S. PATENT DOCUMENTS

| | | | |
|---|---|---|---|
| 7,866,393 B2 | 1/2011 | Badalamenti et al. | |
| 8,307,916 B1 | 11/2012 | Wald | |
| 9,587,163 B2 | 3/2017 | Gaudette et al. | |
| 10,106,718 B2 * | 10/2018 | Villarreal, Jr. | C09K 8/805 |
| 10,502,991 B2 | 12/2019 | Yu et al. | |
| 10,538,028 B2 | 1/2020 | Rogers et al. | |
| 2008/0017374 A1 | 1/2008 | Surjaatmadja | |
| 2008/0108524 A1 * | 5/2008 | Willberg | C09K 8/035 |
| | | | 507/224 |
| 2012/0031612 A1 | 2/2012 | Lembcke | |
| 2013/0032411 A1 * | 2/2013 | John | E21B 41/02 |
| | | | 175/320 |
| 2013/0068469 A1 * | 3/2013 | Lin | C09K 8/80 |
| | | | 507/201 |
| 2021/0363976 A1 | 11/2021 | Raney et al. | |

* cited by examiner

FOLDABLE PARTICLES FOR LOST CIRCULATION MATERIALS AND RELATED METHOD

FIELD OF THE DISCLOSURE

The present disclosure relates generally to lost circulation materials and related methods.

BACKGROUND OF THE DISCLOSURE

Lost circulation can be encountered during any stage of operations and occurs when drilling fluid (such as drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations, cavernous formations, and highly permeable formations (e.g., formations having a permeability greater than 500 millidarcy). Lost circulation can be categorized by the amount of fluid or mud lost as seepage type, moderate type, severe type, and total loss. The extent of the fluid loss and the ability to control the lost circulation with a lost circulation material (LCM) depends on the type of formation in which the lost circulation occurs.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a particle having a core-shell structure can comprises: a core comprising an expandable material; and a shell around the core, the shell comprising an outer permeable membrane, an inner permeable membrane, and a hardenable material between the outer and inner permeable membranes; and wherein the core-shell structure is folded.

In another embodiment, a drilling fluid can comprise: a base fluid; and the foregoing particles dispersed in the base fluid; and wherein the core-shell structure is in a folded state or a partially folded state In a further embodiment, a method can comprise: drilling at least a portion of a wellbore penetrating a subterranean formation with the foregoing drilling fluid; and exposing the particles to a stimulus that causes the expandable material to expand in volume and the hardenable material to increase in strength Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
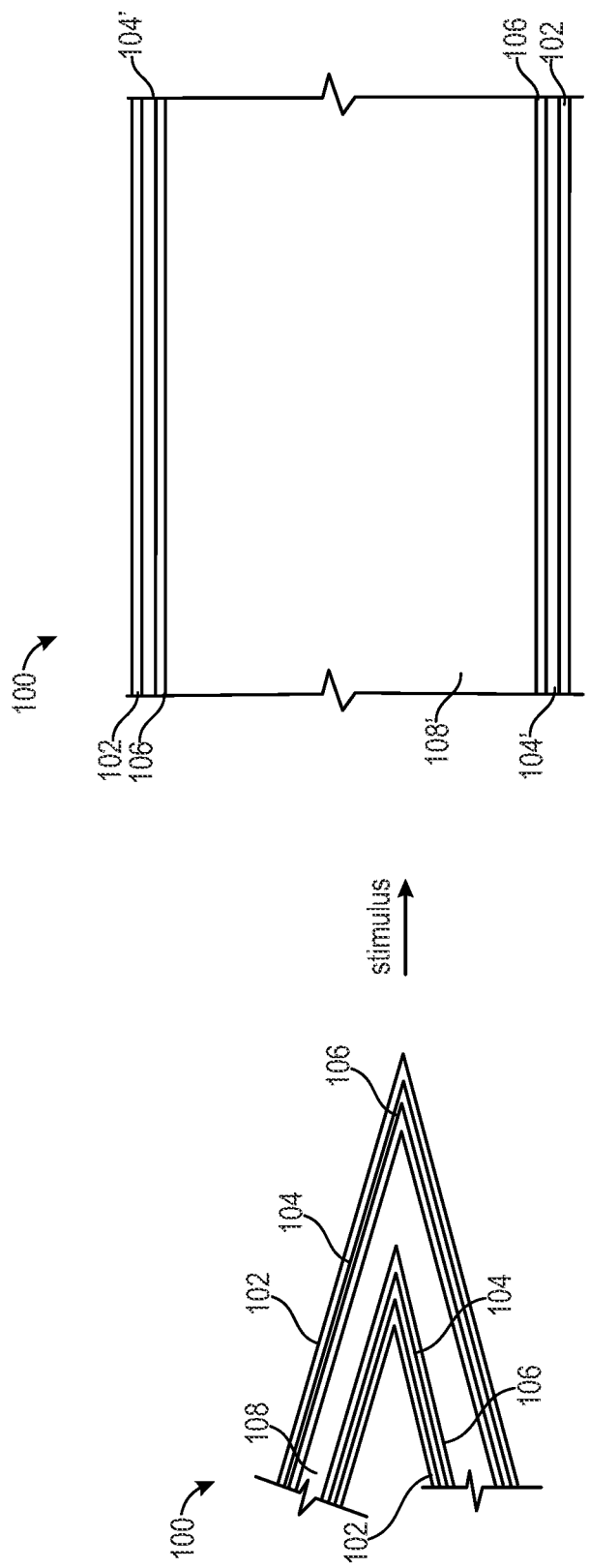
FIG. 1 illustrates a cross-section of a particle of the present disclosure in a folded configuration that transitions to an unfolded configuration after exposure to a stimulus.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates generally to lost circulation materials (LCMs) and related methods. More specifically, the LCMs of the present disclosure are particles with a core-shell structure that are initially folded where, upon exposure to a stimulus, the core expands in volume (which unfolds the particles) and the shell increases in strength. The expanded particles can then clog large openings/apertures in the formation.

For example, FIG. 1 illustrates a cross-section of a particle of the present disclosure. The particle starts in a folded state 100 and includes a shell comprising an outer permeable membrane 102, an inner permeable membrane 106, and a hardenable material 104 between the outer and inner permeable membranes 102,106. The shell encapsulates a core comprising an expandable material 108. The hardenable material 104 is capable of increasing in strength when exposed to a stimulus to produce a hardened material 104', and the expandable material 108 is capable of expanding in volume when exposed to the stimulus to an expanded state 108'. As illustrated in FIG. 1, the expansion of the expandable material 108' causes the particle to unfold into an unfolded state or partially unfolded state.

The permeable membrane of the inner or outer permeable membranes should be permeable to the stimulus that affects the hardenable material and the expandable material.

A permeable membrane may be a woven fabric, a nonwoven fabric, an extruded layer, a cast layer, the like, or a combination thereof.

The permeable membranes may comprise any suitable materials. Examples of said materials may include, but are not limited to, silk, rayon, nylon, linen, cotton, wool, paper, wood, ceramic, glass, fiberglass, carbon fiber, metal fiber, a natural polymer (e.g., cellulose), a synthetic polymer (e.g., vinyl-based polymers, olefin-based polymers, ether- or ketone-based polymers, styrene-based polymers, butadiene-based polymers, imide-based polymers, sulfone-based polymers, phenyl-based polymers, fluoride-based polymers, thermoplastic polyurethane, or a rubber), the like, and any combination thereof.

Examples of stimuli may include, but are not limited to, the exposure to an aqueous fluid, exposure to an oleaginous fluid, exposure to a crosslinker, an increase in temperature, a change in pH, a change in ionic concentration, the like, and any combination thereof.

The hardenable material should be a material that increases in strength when exposed to the stimulus. Examples of hardenable materials may include, but are not limited to, a cement binder (e.g., where the stimulus may be exposure to an aqueous fluid), gypsum (e.g., where the stimulus may be an increase in temperature and/or exposure to an aqueous fluids), hardenable resin (e.g., where the stimulus may be exposure to an aqueous fluid, exposure to an oleaginous fluid, an increase in temperature, or a change in pH), a crosslinkable polymer like an epoxy (e.g., where the stimulus may be exposure to a crosslinking agent), the like, and any combination thereof.

The hardenable material may be a part of a mixture comprising the hardenable material and an additive. Said additive may be useful, for example, in regulating a rate of hardening of the hardenable material. For example, a set retarder or a set accelerator may be included with a cement binder and/or gypsum. As such, the particles may comprise a core comprising an expandable material; and a shell around the core, the shell comprising an outer permeable membrane, an inner permeable membrane, and a mixture between the outer and inner permeable membranes, wherein the mixture comprise (a) a hardenable material (e.g., cement binder and/or gypsum) and (b) either a set retarder or a set accelerator.

The hardenable material may increase in compressive strength and/or stiffness after exposure to the stimulus.

The hardenable material may be present throughout the shell. For example, a hardenable material may be present between the two permeable membranes throughout the entire shell. Alternatively, the hardenable material may be present in only a portion of the shell. For example, a portion of the shell between the two permeable layers may include no hardenable material. Such embodiments may allow for increased strength in a portion of the shell in the unfolded state but also elasticity in other portions of the shell in the unfolded state.

The hardenable material after exposure to the stimulus may increase in strength and also decrease in porosity. In some instances, the hardenable material may form a gas-impermeable layer (having an oxygen transmission rate of 5 $cm^3/m^2/day$ or less) (e.g., a crosslinked epoxy) between the two permeable membranes.

The expandable material should be a material that increases in volume when exposed to the stimulus. Examples of expandable materials may include, but are not limited to, a water-swellable polymer (e.g., where the stimulus may be exposure to an aqueous fluid), an oil-swellable polymer (e.g., where the stimulus may be exposure to an oleaginous fluid), a foaming agent (e.g., where the stimulus may be an increase in temperature, change in pH, or exposure to an aqueous fluid), a gas-generating agent (e.g., where the stimulus may be exposure to an aqueous fluid, exposure to an oleaginous fluid, an increase in temperature, or a change in pH), the like, and any combination thereof.

Examples of water-swellable polymers may include, but are not limited to, hyaluronic acid, chitosan, heparin, alginate, gelatin, fibrin, polyvinyl alcohol, polyethylene glycol, sodium polyacrylate, potassium polyacrylate, acrylate polymers, the like, and any combination thereof.

Examples of oil-swellable polymers may include, but are not limited to, copolymers having (a) an olefinically unsaturated hydrocarbon monomer, (b) a monomer having an epoxy pendant group, and optionally (c) a polar monomer. The monomer having an epoxy pendant group may be a glycidyl acrylate monomer (for example, glycidyl methacrylate). The molar ratio of unsaturated hydrocarbon monomer to epoxy containing monomer is in the range of about 75:25 to about 99:1. When a polar monomer is included, the molar ratio of the sum of olefinically unsaturated hydrocarbon monomer and the polar monomer to epoxy containing monomer is in the range of about 75:25 to about 99:1. Examples of suitable polar monomers include olefinically unsaturated esters that include, but are not limited to, methyl acrylate, methyl methacryalate, ethyl acrylate, ethyl methacrylate, butyl acrylate, butyl methacrylate, the like, and any combination thereof. In some embodiments, the elastomeric polymer may be ethylene/methyl acrylate/glycidyl methacrylate terpolymer. In some embodiments, the elastomeric polymer may be Lotader® AX8840 or Lotader® AX8900 available from Arkema Inc., of King of Prussia, Philadelphia, USA.

Foaming agents may be surfactants including anionic surfactants, cationic surfactants, nonionic surfactants, zwitterionic surfactants, and any combination thereof. Examples of foaming agents may include, but are not limited to, sodium dodecyl sulfate, sodium dodecylbenzenesulfonate, cetyltrimethylammonium bromide, the like, and any combination thereof.

Examples of gas-generating agents may include, but are not limited to, sodium bicarbonate, aluminum-containing cements, azodicarbonamide, oxybis(benzenesulphonyl hydrozide), p-toluenesulphonyl hydrazide, toluenesulphonyl semicarbazide, the like, and any combination thereof.

The particles of the present disclosure may have a multitude of states (or configurations) including a folded state, a partially unfolded state, and an unfolded state. Each state may have different properties like shape, dimensions, volume, compressive strength, stiffness, and the like.

Figure 2:
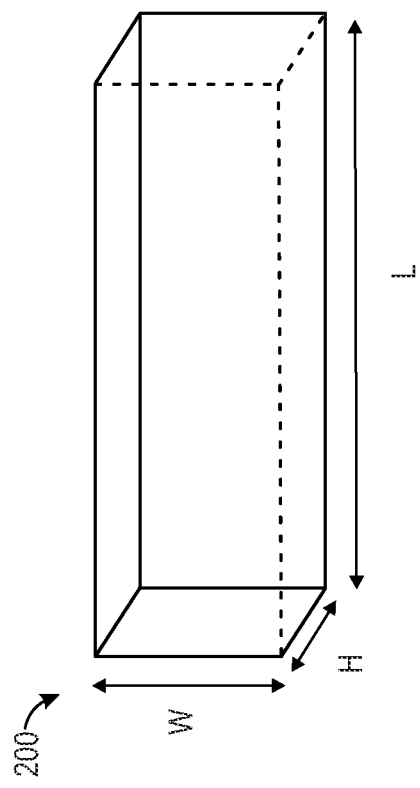
FIG. 2 illustrates a particle of the present disclosure in a folded configuration that transitions to an unfolded configuration after exposure to a stimulus.
Figure 2:
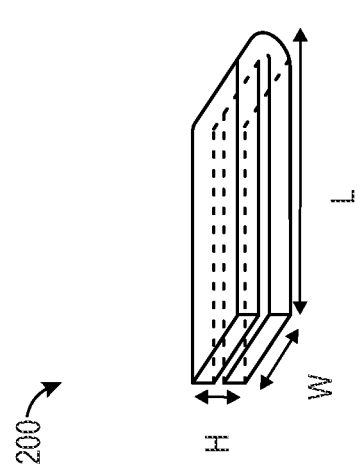

The dimensions of particles of the present disclosure in a given state may be characterized by a length, a width, and a height. FIG. 2 illustrates a particle of the present disclosure in a folded configuration 200 that transitions to an unfolded configuration 200' after exposure to a stimulus. For each state 200, 200', the dimension may be characterized by the length L, width W, and height H, where L≥W≥H designates the selection of length L, width W, and height H.

The height of a particle of the present disclosure in the folded state may be 0.1 mm to 3 mm (or 0.1 mm to 1 mm, or 0.5 mm to 2 mm, or 1 mm to 3 mm). The length of a particle of the present disclosure in the folded state may be 0.2 mm to 5 mm (or 0.2 mm to 1 mm, or 0.5 mm to 3 mm, or 2 mm to 5 mm). An aspect ratio (L/H) of a particle of the present disclosure in the folded state may be 2 to 50 (or 2 to 25, or 10 to 35, or 25 to 50).

The height of a particle of the present disclosure in the unfolded state may be 0.1 mm to 10 mm (or 0.1 mm to 3 mm, or 1 mm to 7 mm, or 5 mm to 10 mm). The length of a particle of the present disclosure in the unfolded state may be 0.5 mm to 15 mm (or 0.5 mm to 5 mm, or 1 mm to 10 mm, or 5 mm to 15 mm). An aspect ratio (L/H) of a particle of the present disclosure in the unfolded state may be 1 to 150 (or 1 to 25, or 10 to 100, or 50 to 150).

The volume of a particle of the present disclosure in the folded state may be 0.5 mm$^3$ to 20 mm$^3$ (or 0.5 mm$^3$ to 5 mm$^3$, or 3 mm$^3$ to 15 mm$^3$, or 10 mm$^3$ to 20 mm$^3$).

The volume of a particle of the present disclosure in the unfolded state may be 10 mm$^3$ to 1000 mm$^3$ (or 10 mm$^3$ to 100 mm$^3$, or 50 mm$^3$ to 500 mm$^3$, or 250 mm$^3$ to 1000 mm$^3$).

An increase in volume of a particle of the present disclosure from the folded state to the unfolded state may be an increase by 2 times to 50 times (or 2 times to 15 times, or 10 times to 30 times, or 25 times to 50 times).

The compressive strength of a particle after exposure to the stimulus causing the strengthening of the hardenable material may be 0.1 MPa to 10 MPa (or 0.1 MPa to 5 MPa, or 3 MPa to 7 MPa, or 5 MPa to 10 MPa).

The particles of the present disclosure may be produced by a variety of methods. For example, the particles may be produced by 3D-printing technologies that use dual nozzles with a first nozzle delivering the hardenable material and a second nozzle delivering the permeable membrane material where the 3D-printing occurs around the expandable material. Alternatively, a sheet of the permeable membrane may be impregnated with the hardenable material and subsequently folded (e.g., by robotic arms). Alternatively, the shell may include a shape-memory material and/or a self-folding polymer that allows for an unfolded or partially unfolded state to be produced that is then folded per the shape-memory material and/or a self-folding polymer.

The particles of the present disclosure may be used as lost circulation materials in wellbore fluids like drilling fluids.

A drilling fluid may include a base fluid and the particles of the present disclosure (e.g., in a folded state or a partially folded state).

The particles of the present disclosure may be included in a drilling fluid in an amount of 1 pound per barrel (ppb) to 60 ppb (or 1 ppb to 30 ppb, or 15 ppb to 45 ppb, or 30 ppb to 60 ppb).

The base fluid of the drilling fluid may be an oleaginous fluid or an aqueous-based fluid.

The oleaginous fluid may be any suitable fluid, such as oil or a solution containing both oil and one or more organic or inorganic compounds dissolved in the oil or otherwise completely miscible with the oil. The oleaginous fluid may include at least one naturally-derived or synthetically-derived oil. The oleaginous fluid may include oils derived from petroleum, such as mineral oils; diesel oils; linear or branched olefins; polyolefins; alkanes; paraffins; esters of fatty acids; straight chain, branched or cyclical alky ethers of fatty acids; other petroleum-derived oils; or combinations of any of these. The oleaginous fluid may contain esters, ethers, acetals, dialkylcarbonates, hydrocarbons, or combinations of any of these. The oleaginous fluid may also include oils derived from animals or plants, for example. The oleaginous fluid may also include other oils, such as, but not limited to, poly diorganosiloxanes, siloxanes, organosiloxanes, other silicone-based oils, or combinations of these.

An aqueous-based fluid may be any suitable fluid, such as water or a solution containing both water and one or more organic or inorganic compounds dissolved in the water or otherwise completely miscible with the water. Examples of water sources may include, but are not limited to, freshwater, well water, filtered water, distilled water, sea water, salt water, produced water, formation brine, the like, and any combination thereof. For example, the aqueous fluid may contain brine, including natural and synthetic brine. The aqueous fluid may include water containing water-soluble organic compounds, such as alcohols, organic acids, amines, aldehydes, ketones, esters, or other polar organic compounds, or salts dissolved in the water. In some embodiments, the aqueous fluid may include salts, water-soluble organic compounds, or both, as impurities dissolved in the water. Further, the aqueous fluid may include salts, water-soluble organic compounds, or both, to modify at least one property of the aqueous fluid, such as density or ionic concentration. Increasing the amount of salt, water-soluble organic compounds, or both, may increase the density of the drilling fluid. Examples of salts that may be present in the aqueous fluid may include, but are not limited to, metal salts, such as sodium salts, calcium salts, cesium salts, zinc salts, aluminum salts, magnesium salts, potassium salts, strontium salts, silicates, lithium salts, the like, and any combination thereof. The metal salts may be in the form of chlorides, bromides, carbonates, hydroxides, iodides, chlorates, bromates, formates, nitrates, sulfates, phosphates, oxides, fluorides, the like, and any combination thereof.

The drilling fluid may further include other components, which may include, but are not limited to, wetting agents, organophilic clays, viscosifiers, surfactants, dispersants, interfacial tension reducers or emulsifying agents, rheological modifies, pH buffers, mutual solvents, thinners, thinning agents, weighting agents, cleaning agents, the like, and any combination thereof.

The drilling fluids comprising a base fluid, the particles of the present disclosure (e.g., in a folded state or a partially folded state), and optionally other components may be used in a drilling operation where the particles of the present disclosure are lost circulation materials. For example, during a drilling operation, a drilling fluid is continuously pumped into the wellbore to clear and clean the wellbore and the filings (also referred to as cuttings) resulting from drilling. The drilling fluid is typically pumped from a mud pit into the wellbore and returns again to the surface. An indication that a lost circulation zone has been encountered is when the flow rate of the drilling fluid that returns to the surface is less than the flow rate of the drilling fluid pumped into the wellbore. This reduction or absence of returning drilling fluid is referred to as lost circulation.

Drilling fluids comprising the particles of the present disclosure may be used for drilling all or portions of the wellbore. For example, the particles of the present disclosure may be added to the drilling fluid when a lost circulation zone is encountered. Alternatively, the particles of the present disclosure may be included in the drilling fluid regardless of encountering a lost circulation zone.

As the drilling fluid is pumped into the wellbore, the particles of the present disclosure may be in a folded state or partially unfolded state. Having the smaller dimensions of the folded state or partially unfolded state, said particles have less impact on the flowability of the drilling fluid. After introduction to the wellbore, the particles may encounter the stimulus. For example, lost circulation zones have fluids native to the formation (e.g., water, acid (causing a pH change), or oil) that act as a stimulus to cause expansion of the expandable material and hardening of the hardenable material. In another example, the bottom hole circulating temperature may act as a stimulus. More than one stimulus may be encountered after introduction to the wellbore. In an unfolded state or a partially unfolded state, the particles can then clog large openings/apertures.

Alternate to or in combination with native stimuli, an additive may be added to the drilling fluid that acts as a stimulus. For example, water, oil, acid, or base may be added or introduced to the wellbore via the drilling fluid (or via a spacer fluid) after introduction of the particles of the present disclosure. Accordingly, the drilling fluid with the particles of the present disclosure may enter the formation at the lost circulation zone. Then, the subsequently introduced additive may contact the particles and cause expansion of the expandable material and hardening of the hardenable material. In an unfolded state or a partially unfolded state, the particles can then clog large openings/apertures.

In the formation and/or at the wellbore, the particles of the present disclosure after exposure to the stimulus may expand to the full expandable volume and/or harden to the full increased strength the particle is capable of. However, in practice, physical barriers and/or environmental conditions may cause the expansion and/or hardening to not be complete but still allow for the plugging of the lost circulation zone to occur.

In the drilling fluid introduced to the wellbore, the particles of the present disclosure may be in a folded state having the dimensions and the volume described herein or may be in a partially folded state having dimensions and a volume within 10% of the folded state. After exposure to the stimulus, the particles of the present disclosure may expand to the unfolded state having the dimensions and the volume described herein or may be in a partially unfolded state having dimensions and a volume within 10% of the unfolded state. Further, after exposure to the stimulus, the strength of the particles may increase to a compressive strength described above or within 20% of said compressive strength.

EXAMPLES

A shell was produced by layering, in order, fabric, cement binder, and fabric. Hydrogel particles were placed between two layers of the shell. The resultant structure was then folded into particles of the present disclosure by hand. The particles were then exposed to water as the stimulus where the hydrogel expanded and the cement binder cured to increasing strength.

Figure 3:
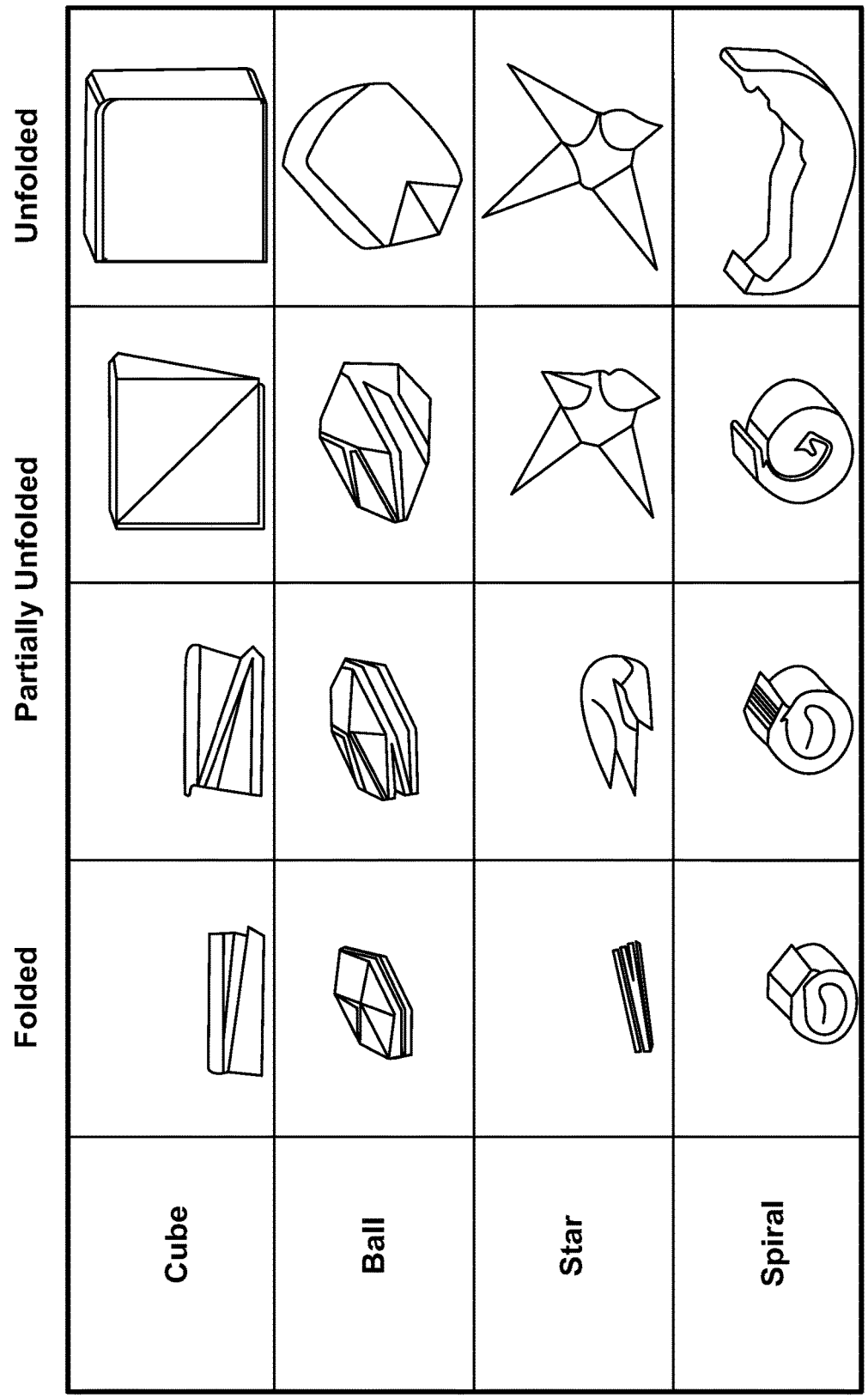
FIG. 3 illustrates four shapes (a cube, a ball, a star, or a spiral) of the particles as they transition from a folded state through two partially unfolded states to an unfolded state.

FIG. 3 illustrates four shapes (a cube, a ball, a star, or a spiral) of the particles in the folded state, two partially unfolded states, and an unfolded state. The shapes illustrated in FIG. 3 are based on images taken of the particle prototypes before and after exposure to the stimulus. The particle prototypes were millimeter-scale particles used to show the unfolding mechanism. The particle prototypes can be manufactured to smaller sizes to achieve the dimension of the particles of described herein.

Figure 4:
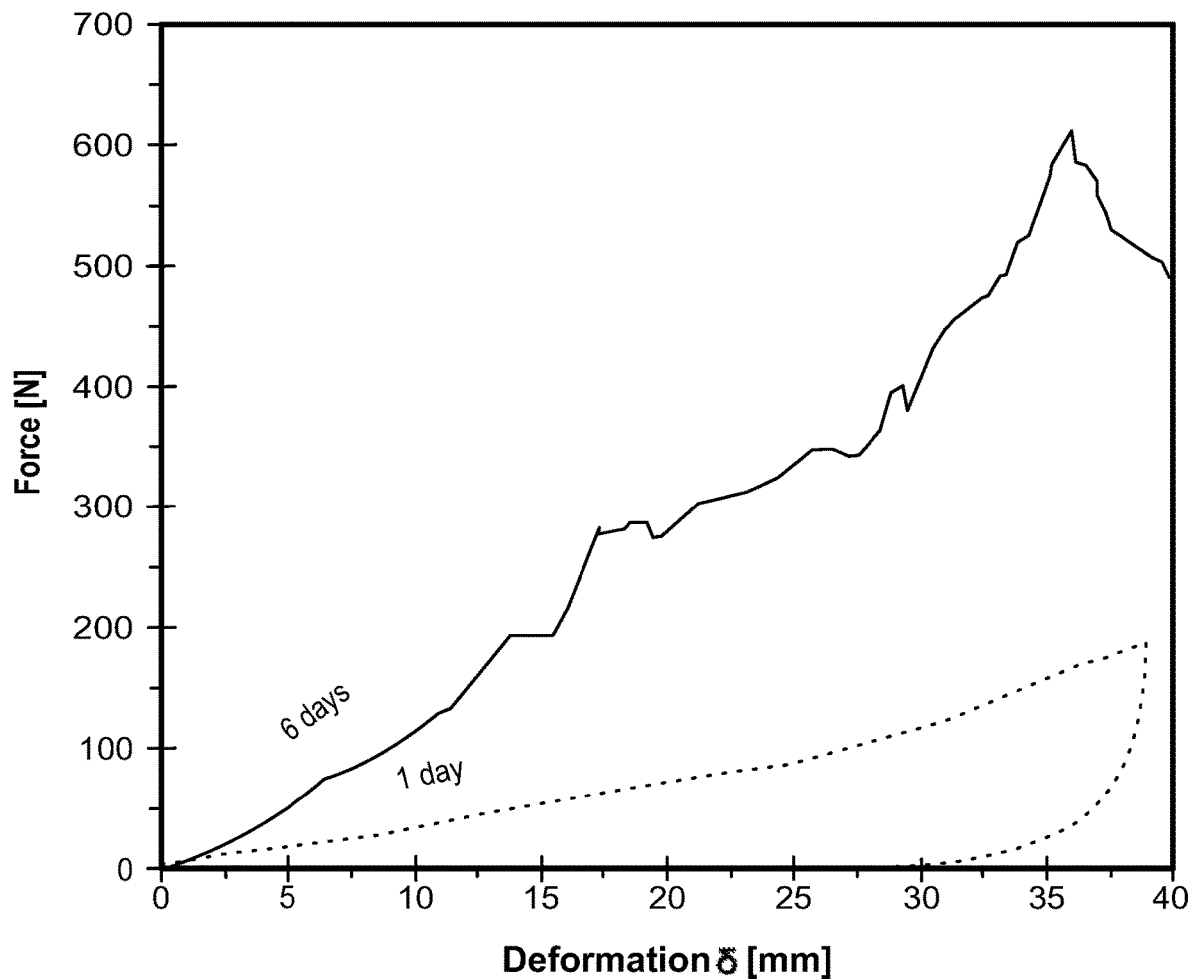
FIG. 4 illustrates a force-displacement curve (axial compression) for the unfolded cube after expansion and curing for 1 day or 6 days.

FIG. 4 illustrates a force-displacement curve (axial compression) for the unfolded cube after expansion and curing for 1 day or 6 days.

Figure 5:
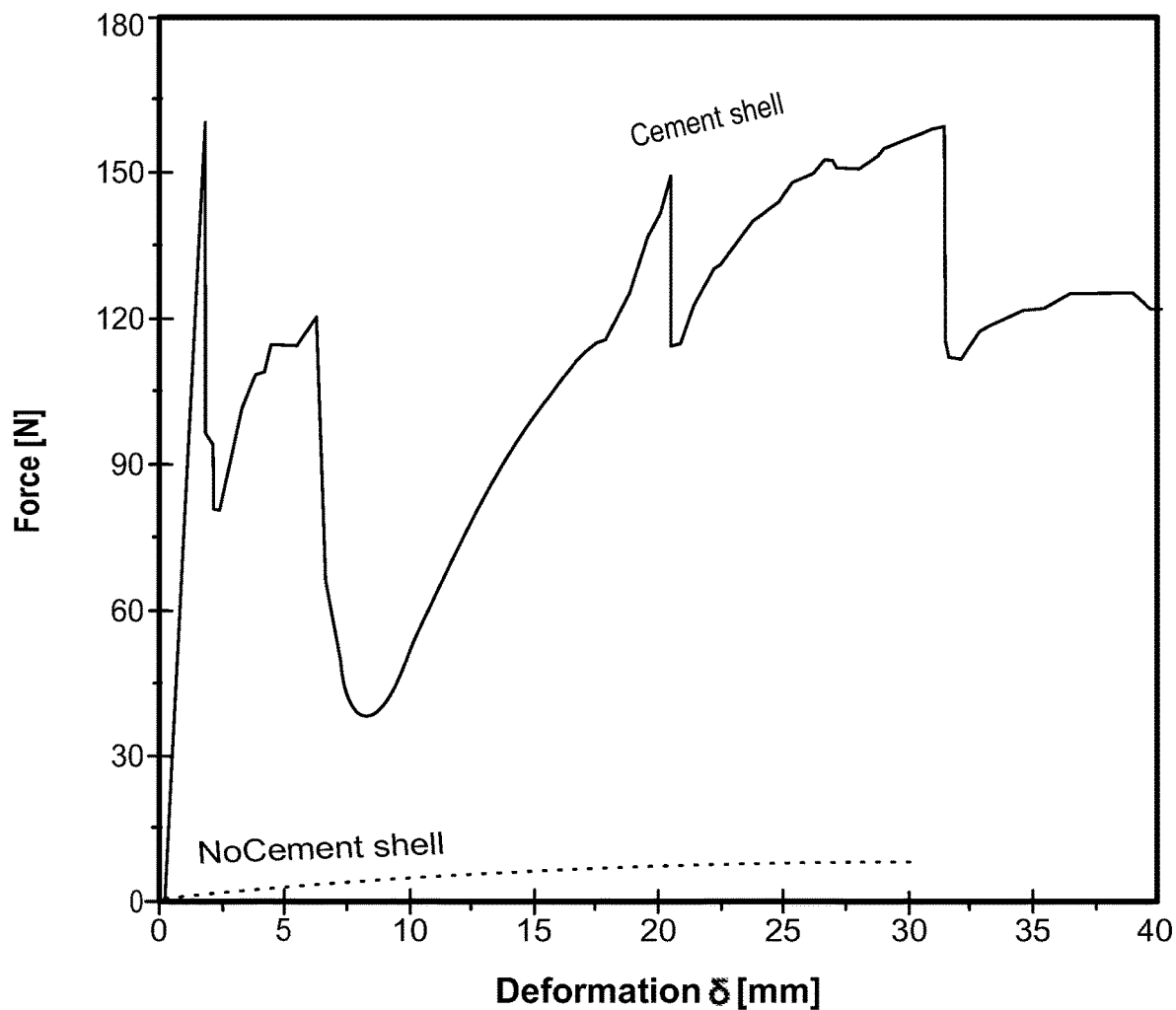
FIG. 5 illustrates a force-displacement curve (three-point bending) for the unfolded spiral after expansion for particles with or without a cement shell.

FIG. 5 illustrates a force-displacement curve (three-point bending) for the unfolded spiral after expansion for particles with or without a cement shell. This illustrates that the hardened shell provides structural support for the particle so that it effectively clog large openings/apertures.

EXAMPLE EMBODIMENTS

A first example embodiment disclosed herein is a composition comprising: a particle having a core-shell structure that comprises: a core comprising an expandable material; and a shell around the core, the shell comprising an outer permeable membrane, an inner permeable membrane, and a hardenable material between the outer and inner permeable membranes; and wherein the core-shell structure is folded.

The first example embodiment may have one or more of: Element 1: wherein the expandable material comprises a water-swellable polymer or an oil-swellable polymer; Element 2: wherein the expandable material comprises a foaming agent and/or a gas-generating agent; Element 3: Element 2 and wherein the hardenable material forms a gas-impermeable substance when exposed to a stimulus; Element 4: wherein one or both of the outer and inner permeable membranes comprise a woven fabric, a nonwoven fabric, an extruded layer, a cast layer, or a combination thereof; Element 5: wherein one or both of the outer and inner permeable membranes comprise fiberglass, a natural polymer, a synthetic polymer, a thermoplastic polymer, a thermoplastic elastomer, a thermoplastic polyurethane, a rubber, or any combination thereof; Element 6: wherein the hardenable material comprises a cement binder; Element 7: Element 6 and wherein the hardenable material further comprises a set retarder or a set accelerator; Element 8: wherein the hardenable material comprises gypsum, a hardenable resin, a crosslinkable polymer, or any combination thereof; Element 9: wherein the hardenable material is capable of increasing in compressive strength and/or stiffness when exposed to an aqueous fluid, an oleaginous fluid, a crosslinker, an increase in temperature, a change in pH, a change in ionic concentration, or any combination thereof; Element 10: wherein the particles are capable of expanding from a folded state to an unfolded state when exposed to a stimulus with a volume increase of 2 times to 50 times; Element 11: Element 10 and wherein the stimulus comprises exposure to an aqueous fluid, exposure to an oleaginous fluid, exposure to a crosslinker, an increase in temperature, a change in pH, a change in ionic concentration, or any combination thereof; Element 12: wherein the particles in a folded state have a volume of 0.5 mm$^3$ to 20 mm$^3$; Element 13: wherein the particles in an unfolded state have a volume of 10 mm$^3$ to 1000 mm$^3$; and Element 14: wherein the hardenable material is present in only a portion of the shell. Examples of combinations include Element 1 in combination with one or more of Elements 2-14; Element 2 (optionally in combination with Element 3) in combination with one or more of Elements 4-14; Element 4 in combination with one or more of Elements 5-14; Element 5 in combination with one or more of Elements 6-14; Element 6 (optionally in combination with Element 7) in combination with one or more of Elements 8-14; Element 8 in combination with one or more of Elements 9-14; Element 9 in combination with one or more of Elements 10-14; Element 10 (optionally in combination with Element 11) in combination with one or more of Elements 12-14; and two or more of Elements 12-14 in combination.

A second example embodiment disclosed herein is a drilling fluid comprising: a base fluid; and the composition of the first example embodiment (the particles) dispersed in the base fluid; and wherein the core-shell structure is in a folded state or a partially folded state. The second example embodiment may include one or more of Elements 1-14.

A third example embodiment disclosed herein is a drilling fluid comprising: a base fluid; particles dispersed in the base fluid, the particles comprising: a core comprising an expandable material; and a shell around the core, the shell comprising an outer permeable membrane, an inner permeable membrane, and a hardenable material between the outer and inner permeable membranes; and wherein the core-shell structure is in a folded state or a partially folded state. The third example embodiment may have one or more of: any of Elements 1-14; Element 15: wherein the particles are present in the drilling fluid at 0.1 wt % to 10 wt % based on a weight of the base fluid; and Element 16: wherein the particles are capable of expanding from a folded state to an unfolded state when exposed to a stimulus with a volume increase of 2 times to 50 times.

A fourth example embodiment disclosed herein is a method comprising: drilling at least a portion of a wellbore penetrating a subterranean formation with the drilling fluid of the third example embodiment; and exposing the particles to a stimulus that causes the expandable material to expand in volume and the hardenable material to increase in strength. The fourth example embodiment may include one or more of Elements 1-16; and Element 17: the method further comprising: introducing an additive to the wellbore, wherein the additive is the stimulus.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:
1. A method comprising:
providing a drilling fluid comprising:
a base fluid;
particles dispersed in the base fluid, the particles comprising:
a core comprising an expandable material; and
a shell around the core, the shell comprising an outer permeable membrane, an inner permeable membrane, and a hardenable material between the outer and inner permeable membranes;
wherein the core-shell structure is in a folded state or a partially folded state; and
drilling at least a portion of a wellbore penetrating a subterranean formation with the drilling fluid, wherein the wellbore includes one or more lost circulation zones;
wherein the particles expand from the folded state or partially folded state to an unfolded state after being placed in the one or more lost circulation zones and when exposed to a stimulus, and wherein expansion increases a volume of the particles 2 times to 50 times; and
wherein the hardenable material increases in strength in response to the stimulus.

2. The method of claim 1 further comprising:
introducing an additive to the wellbore, wherein the additive is the stimulus.

3. The method of claim 1, wherein the expandable material comprises a water-swellable polymer or an oil-swellable polymer.

4. The method of claim 1, wherein the expandable material comprises a foaming agent and/or a gas-generating agent.

5. The method of claim 1, wherein the hardenable material forms a gas-impermeable substance when exposed to the stimulus, the gas-impermeable substance being located between the outer permeable membrane and the inner permeable membrane.

6. The method of claim 1, wherein one or both of the outer and inner permeable membranes comprise a woven fabric, a nonwoven fabric, an extruded layer, a cast layer, or a combination thereof.

7. The method of claim 1, wherein one or both of the outer and inner permeable membranes comprise fiberglass, a natural polymer, a synthetic polymer, a thermoplastic polymer, a thermoplastic elastomer, a thermoplastic polyurethane, a rubber, or any combination thereof.

8. The method of claim 1, wherein the hardenable material comprises a cement binder.

9. The method of claim 8, wherein the hardenable material further comprises a set retarder or a set accelerator.

10. The method of claim 1, wherein the hardenable material comprises gypsum, a hardenable resin, a crosslinkable polymer, or any combination thereof.

11. The method of claim 1, wherein the hardenable material is capable of increasing in compressive strength and/or stiffness when exposed to an aqueous fluid, an oleaginous fluid, a crosslinker, an increase in temperature, a change in pH, a change in ionic concentration, or any combination thereof.

12. The method of claim 1, wherein the stimulus comprises exposure to an aqueous fluid, exposure to an oleaginous fluid, exposure to a crosslinker, an increase in temperature, a change in pH, a change in ionic concentration, or any combination thereof.

13. The method of claim 1, wherein the particles, when folded, have a volume of 0.5 mm$^3$ to 20 mm$^3$.

14. The method of claim 1, wherein the particles, when in an unfolded state, have a volume of 10 mm$^3$ to 1000 mm$^3$.

15. The method of claim 1, wherein the hardenable material is present in only a portion of the shell.

16. The method of claim 1, wherein the particles are present in the drilling fluid at 0.1 wt % to 10 wt % based on a weight of the base fluid.

* * * * *